United States Patent [19]

Eckel et al.

[11] Patent Number: 5,075,375
[45] Date of Patent: Dec. 24, 1991

[54] IMPACT-RESISTANT POLYSULPHONE-ABS MOULDING COMPOUNDS

[75] Inventors: Thomas Eckel; Ulrich Jansen, both of Dormagen; Karl-Heinz Ott, Leverkusen, all of Fed. Rep. of Germany

[73] Assignee: Bayer Aktiengesellschaft, Leverkusen, Fed. Rep. of Germany

[21] Appl. No.: 564,497

[22] Filed: Aug. 8, 1990

[30] Foreign Application Priority Data

Aug. 15, 1989 [DE] Fed. Rep. of Germany ....... 3926851

[51] Int. Cl.5 ............................................. C08G 63/91
[52] U.S. Cl. ....................................... 525/68; 525/69; 525/77; 525/79; 525/84
[58] Field of Search ............................................ 525/68

[56] References Cited

U.S. PATENT DOCUMENTS 3,111,501 11/1963 Thompson ......................... 260/45.5
3,555,119 1/1971 Ingulli et al. ......................... 260/876
3,636,140 1/1972 Ingulli et al. .................... 260/876 R
4,526,928 7/1985 Mathumoto et al. ................. 525/76
4,659,790 4/1987 Shimozato et al. ................... 526/87

FOREIGN PATENT DOCUMENTS 3601420 7/1987 Fed. Rep. of Germany .

*Primary Examiner*—John C. Bleutge
*Assistant Examiner*—D. E. Alyward
*Attorney, Agent, or Firm*—Joseph C. Gil; Richard E. Henderson

[57] ABSTRACT

Thermoplastic moulding compounds containing
A. 5 to 99 parts by weight of aromatic, high deflection temperature poly(ether sulphone),
B. 5 to 95 parts by weight of alpha-methylstyrene polymer and
C. 1 to 95 parts by weight of graft polymer of resin-forming monomers on a rubber, a process for their production and their use for the production of mouldings.

7 Claims, No Drawings

IMPACT-RESISTANT POLYSULPHONE-ABS MOULDING COMPOUNDS

The invention relates to thermoplastic moulding compounds from poly(ether sulphones), special alpha-methylstyrene polymers and grafted particulate rubbers, a process for their production by mixing the components at elevated temperature and their use for production of mouldings, principally by injection moulding or extrusion.

High deflection temperature ABS moulding compounds containing alpha-methylstyrene polymers are known (U.S. Pat. No. 3,111,501).

In EP-A 42 572 it was proposed to make the proportion of the alpha-methylstyrene in the polymer as high as ever possible. This leads indeed to an improvement in the heat deflection temperature, but the thermal stability at high temperatures, that is during processing, is reduced.

U.S. Pat. No. 4,659,790 teaches that the thermal stability and the heat deflection temperature of alpha-methylstyrene/acrylonitrile copolymers will be particularly favourable if the copolymer has a specific alpha-methylstyrene sequence length; in particular the alpha-methylstyrene triads should not constitute more than 15 weight % of the polymer.

In U.S. Pat. No. 3,555,119 and DE OS 2 025 467 blends of aromatic poly(ether sulphones), alpha-methylstyrene/acrylonitrile copolymers and acrylonitrile/butadiene/styrene copolymers (ABS) are described. These mixtures are said to be outstanding for their favourable flow properties and high heat deflection temperature under load.

In DE-OS 3 601 420 mixtures of aromatic poly(ether sulphones), styrene/acrylonitrile or alpha-methylstyrene/acrylonitrile copolymers as well as special graft polymers—namely multi-shell graft polymers of the MBS type—are described, which are outstanding for high notched impact strengths.

Mixtures of poly(ether sulphones) and ABS are outstanding for a balanced heat deflection temperature, notched impact strength (even at lower temperatures) and good processability (good flow behaviour). It has turned out, however, that the tenacity of these mixtures is insufficient for some applications, e.g. for the production of motor vehicle parts (internal and external areas) which are exposed to strong impact and shock loading.

It has been found that the notched impact strength and the heat deflection temperature of moulding compounds of poly(ether sulphones), alpha-methylstyrene polymers and ABS can be improved with favourable processing properties if terpolymers of alpha-methylstyrene, acrylonitrile and acrylamide are used as the alpha-methylstyrene polymers.

A subject matter of the invention is thermoplastic moulding compounds containing A. 5 to 99, preferably 20 to 98, especially 40 to 97 parts by weight of aromatic, high deflection temperature poly(ether sulphone), B. 5 to 95, preferably 10 to 75, especially 15 to 55 parts by weight of alpha-methylstyrene polymer from B.1 62-85 parts by weight, preferably 69-80 parts by weight of alpha-methyl styrene, B.2 10-50 parts by weight, preferably 14-37 parts by weight, especially 14-30 parts by weight of acrylonitrile and/or methacrylonitrile and B.3 1-50 parts by weight, preferably 1-20 parts by weight, especially 1-10 parts by weight of acrylamide and/or methacrylamide and C. 1-95 parts by weight, preferably 2-60 parts by weight, especially 3-40 parts by weight of a graft polymer of resin-forming monomers on a rubber.

Aromatic poly(ether sulphones)

A within the meaning of the invention are preferably linear, thermoplastic polyarylene polyether sulphones, in which the arylene units are linked via ether and sulphone groups. They are obtained by reaction of an alkali metal double salt of a divalent phenol (bisphenol) with a benzenoid compound containing two halogen atoms, where at least one of the two reactants must contain a sulphone group ($-SO_2-$). Poly(ether sulphones) and their production are known (cf. U.S. Pat. No. 3,264,536, GB Patent 1 264 900, EP-A 0 038 028)

The poly(ether sulphones) A according to the invention contain repeating units of the formula (I)

$$-O-Z-O-W-  \quad (I)$$

where

Z signifies the group of a divalent phenol and

W signifies the group of the benzenoid compound with an inert electron-attracting group and where Z and W are linked by aromatic carbon atoms via valence bonds to the oxygen atoms and at least one of the groups Z and W has a sulphone group between aromatic carbon atoms.

Preferred diphenols for the production of the aromatic poly(ether sulphones) A are compounds of the formula (II)

$$HO-Z-OH \quad (II)$$

where Z signifies a divalent, single or multinuclear aromatic group with 6-30 C atoms, and the two OH groups are bonded directly to C atoms.

Especially preferred diphenols have the formula (III)

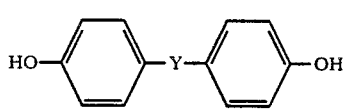

In which Y signifies a single bond, an alkylene or alkylidene group with 1-7 C atoms, a cycloalkylene or cycloalkylidene group with 5-12 C atoms, $-O-$, $-S-$,

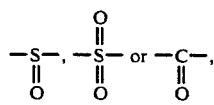

as well as their ring-alkylated and ring-halogenated derivatives.

Examples of diphenols are:
hydroquinone,
resorcinol,
dihydroxydiphenyls,
bis-(hydroxyphenyl)-alkanes,
bis-(hydroxyphenyl)-cycloalkanes,
bis-(hydroxyphenyl)-ethers,
bis-(hydroxyphenyl)-ketones, bis-(hydroxyphenyl)-sulphoxides bis-(hydroxyphenyl)-sulphones and alpha, alpha.-bis-(hydroxyphenyl)-diisopropylbenzenes and corresponding ring-alkylated and ring-halogenated derivatives.

The most important diphenols are: bisphenol A, tetramethylbisphenol A, 1,1-bis-(4-hydroxy-phenyl)isobutane, 1,1-bis-(4-hydroxy-phenyl)-cyclohexane, 4,4'-dihydroxybiphenyl, 4,4'-dihydroxydiphenylsulphide, 4,4'-dihydroxydiphenylsulphone and their di- and tetrahalogenated and alkylated derivatives. Especially preferred is bisphenol A. Any mixtures of the diphenols named can also be used.

Preferred aromatic dihaloqeno compounds are binuclear compounds of the formula (IV)

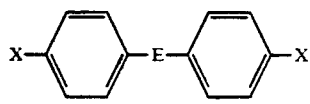

in which

X signifies halogen (F, Cl, Br, I) and E divalent electron-attracting groups, such as sulphone, carbonyl, vinyl, sulphoxide or azo groups. Each of the two benzene rings can be substituted with one or more saturated hydrocarbon groups or electron-attracting groups.

Preferred aromatic dihalogeno compounds of formula (IV) are 4,4'-dichlorodiphenyl sulphone, 4,4'-difluororodiphenyl sulphone, 4,4'-dichlorobenzophenone and 4,4'-difluorobenzophenone.

The aromatic poly(ether sulphones) can also be branched. Suitable branching agents are known for the production of aromatic polyesters (DE-OS 2 940 024) and for the production of aromatic poly(ester carbonates) (DE-OS 3 007 934).

Preferably used as chain stoppers in the production of the aromatic poly(ether sulphones) A are phenol, alkylphenols with $C_1-C_{12}$ alkyl groups and halogenated phenols as well as bromides and chlorides of $C_1-C_{10}$ alkanes in amounts of 0.1 to 10 mole % (in the case of phenols relative to the diphenols, in the case of chlorides relative to the aromatic dihalogeno compounds).

The reduced viscosities ($\eta_{red}$) of the aromatic poly(ether sulphones) A are 0.15 to 1.5 dl/g, preferably 0.35 to 0.65 dl/g (measured on solutions of 20 mg poly(ether sulphone) A in 10 ml $CHCl_3$ at 25° C.).

alpha-methylstyrene polymers B are alpha-methylstyrene terpolymers which are formed by polymerization of B.1 62-85 parts by weight, preferably 69-80 parts by weight of alpha-methyl styrene, B.2 10-50 parts by weight, preferably 14-37 parts by weight, especially 14-30 parts by weight of acrylonitrile and/or methacrylonitrile and B.3 1-50 parts by weight, preferably 1-20 parts by weight, especially 1-10 parts by weight of acrylamide and/or methacrylamide.

The mixture of A, B and C contains 5 to 95, preferably 10 to 75, especially 15 to 55 parts by weight of the alpha-methylstyrene polymer B.

The alpha-methylstyrene polymer B can be produced by emulsion polymerization known in itself. In this connection, polymerization with continuous monomer addition or incremental monomer addition at temperatures of 50° to 90° C. is preferred.

As emulsifiers can be used known, preferably anionic surfactants; e.g. Na or K salts of disproportionated abietic acid or higher fatty acids and alkali salts of alkyl- and alkylarylsulphonic acids and alkylarylcarboxylic acids. Organic sulphates are also suitable. Also nonionic emulsifiers, e.g. poly(ethylene oxide) alkyl ethers, or combinations of several emulsifiers can be used.

As initiators, water-soluble organic peroxides, azo compounds, alkali persulphates and perphosphates can be used; at polymerization temperatures below 60° C. redox systems based on organic peroxides and water-soluble reducing agents are especially suitable. Examples of initiators are potassium and ammonium peroxodisulphate and as redox systems cumol hydroperoxide/$Fe^{++}$-formaldehyde sulphoxylate (Rongalit); p-methanehydroperoxide/$Fe^{++}$/ Rongalit; diisopropylbenzene hydroperoxide/$Fe^{++}$/ascorbic acid.

As regulator for adjustment of the molecular weights of the polymers can be used organic sulphur compounds, such as mercaptans and disulphides, long-chain mercaptans, e.g. n- and tert-dodecylmercaptan, being preferred. The regulators are preferably dissolved in the monomer mixture.

Emulsifiers, initiators and regulators can also be added continuously or discontinuously during the polymerization.

After the polymerization, the polymer latex obtained, optionally after mixing with other polymer latices and/or after addition of additives, is coagulated in known manner (e.g. by addition of mineral acid and/or salt) and washed. The polymer can be dried to powder in vacuum at 100°-150° C. or preferably dried by degassing of the polymer melts in an extruder.

In order to obtain moulding compounds with very good deflection temperature under load, it is necessary to reduce the concentration of volatile constituents (water, residual monomers) to less than 4000 ppm, preferably less than 2000 ppm.

Graft polymers C are basically graft polymers of resin-forming monomers on a rubber. They include graft polymers with rubbery elastic properties, which are in the main obtainable from at least 2 of the following monomers: chloroprene, butadiene-1,3, isoprene, styrene, acrylonitrile, ethylene, propylene, vinyl acetate and (meth)acrylate esters with 1 to 18 C atoms in the alcohol component; also polymers as described e.g. in "Methoden der Organischen Chemie" (Houben-Weyl),Bd. 14/1, Georg Thieme-Verlag, Stuttgart 1961, pp. 393–406 and in C. B. Bucknall, "Toughened Plastics", Appl. Science Publishers, London 1977.

Preferred graft polymers C are partially crosslinked and have gel contents of above 20 weight %, preferably above weight %, especially above 60 weight %.

Preferred graft polymers C are obtained by polymerization

C.1 5 to 90, preferably 30 to 80 parts by weight of a mixture of

C.1.1 50 to 95 parts by weight of styrene, alpha-methylstyrene, halogen- or methyl-ring-substituted styrenes, methyl methacrylate or mixtures of these compounds and C.1.2 5 to 50 parts by weight of acrylonitrile, methacrylonitrile, methyl methacrylate, maleic anhydride, $C_1-C_4$-alkyl- or phenyl-N-substituted maleimides or mixtures of these compounds in the presence of C.2 10-95, preferably 20 to 70, parts by weight of rubber with a glass transition temperature below $-10°$ C.

Preferred graft polymers C are polybutadiene, butadiene/styrene copolymers and acrylate rubbers; grafted with styrene and/or acrylonitrile and/or alkyl (meth)acrylate esters; i.e. copolymers of the kind described in DE-OS 1 694 173; and polybutadiene, butadiene/styrene copolymers, butadiene/acrylonitrile copolymers, polyisobutenes or polyisoprenes, grafted with alkyl acrylate or alkyl methacrylate esters, vinyl acetate, acrylonitrile, styrene and/or alkylstyrenes, as described e.g. in DE-OS 2 348 377.

Especially preferred graft polymers C are ABS polymers as described e.g. in DE-OS 2 035 390 and DE-OS 2 248 242.

Especially preferred graft polymers C are obtained by graft polymerization of

α. 10 to 70, preferably 15 to 50, especially 20 to 40, weight %, relative to the grafting product C of at least one acrylate ester or methacrylate ester or 10 to 70, preferably 15 to 50, especially 20 to 40, weight % of a mixture of 10 to 50, preferably 20 to 35, weight %, relative to the mixture, of acrylonitrile, acrylate esters or methacrylate esters and 50 to 90, preferably 65 to 80 weight %, relative to the mixture, of styrene, as grafted layer C.1 in presence of β. 30 to 90, preferably 50 to 85, especially 60 to 80, weight % relative to the grafting product C of a butadiene polymer containing at least 50 weight % of polymerized-in butadiene as grafting base C.2, in which the proportion of gel in the grafting base β is at least 70 weight % (measured in toluene), the degree of grafting G is 0.15 to 0.55 and the mean particle diameter $d_{50}$ of the graft polymer C is 0.05 to 2 microns, preferably 0.1 to 0.6 micron.

Acrylate esters and methacrylate esters α are preferably $C_1$-$C_{18}$-alkyl esters. Especially preferred are methyl, ethyl, propyl and t-butyl methacrylate, n-butyl acrylate and t-butyl acrylate.

The grafting base β can contain in addition to butadiene groups up to 50 weight %, relative to β, of polymerized-in groups of other ethylenically unsaturated monomers, such as styrene, acrylonitrile, esters of acrylic or methacrylic acids with 1 to 4 C atoms in the alcohol component (such as methyl acrylate, ethyl acrylate, methyl methacrylate and ethyl methacrylate), vinyl esters and/or vinyl ethers. The preferred grafting base β is pure polybutadiene.

The graft polymers C may be prepared by known methods such as emulsion-, suspension- or mass polymerisation.

During the grafting reaction the grafting monomers are known not to be completely graft-polymerized on the grafting base. Therefore, according to the invention, graft polymers C are understood to be the products obtained by polymerization of the grafting monomers in the presence of the grafting base.

The degree of grafting G designates the weight ratio of grafting monomers to grafting base and is dimensionless.

The mean particle diameter $d_{50}$ is the diameter above which and below which 50 weight % of the particles are to be found. It can be determined with the ultracentrifuge (W. Scholtan, H. Lange, Kolloid Z. and Z. Polymere 250 (1972), 782-796).

Especially preferred graft polymers C are also those from

τ 20 to 90 weight %, relative to C, of acrylate rubber with a glass transition temperature below −20° C. as grafting base C.2 and δ 10 to 80 weight %, relative to C, of at least one polymerizable ethylenically unsaturated monomer whose homo- or copolymer has a glass transition temperature above 25° C., as grafting monomer C.1.

The acrylate rubbers τ are preferably polymers of alkyl acrylate esters, optionally with up to 40 weight %, relative to the acrylate rubber, of other polymerizable, ethylenically unsaturated monomers. The preferred polymerizable acrylate esters include $C_1$-$C_8$-alkyl esters, for example methyl, ethyl, butyl, n-octyl and 2-ethylhexyl esters; halogenoalkyl esters, preferably halogeno-$C_1$-$C_8$-alkyl esters, such as chloroethyl acrylate, as well as mixtures of these monomers.

For crosslinking, monomers with more than one polymerizable double bond can be copolymerized. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as e.g. ethylene glycol dimethacrylate, allyl methacrylate, multiply unsaturated heterocyclic compounds such as e.g. trivinyl and triallyl cyanurate; polyfunctional vinyl compounds, such as di- and trivinylbenzenes, but also triallyl phosphate and diallyl phthalate.

Preferred crosslinking monomers are allyl methacrylate, ethylene glycol dimethacrylate, diallyl phthalate and heterocyclic compounds containing at least 3 ethylenically unsaturated groups.

Especially preferred crosslinking monomers are the cyclic monomers triallyl cyanurate, triallyl isocyanurate, trivinyl cyanurate, triacryloylhexahydro-s-triazine and triallylbenzenes.

The amount of the crosslinking monomers is preferably 0.02 to 5, especially 0.05 to 2 weight %, relative to acrylate rubbers τ.

For cyclic crosslinking monomers with at least 3 ethylenically unsaturated groups it is advantageous to limit the amount below 1 weight % of the acrylate rubber τ.

Preferred "other" polymerizable ethylenically unsaturated monomers, which besides the acrylate esters can optionally serve for the production of the grafting base τ are e.g. acrylonitrile, styrene, alpha-methylstyrene, acrylamides, vinyl-$C_1$-$C_6$-alkyl ethers, methyl methacrylate amd butadiene. Preferred acrylate rubbers τ are emulsion polymers with a gel content of at least 60 weight %.

Further suitable grafting bases C.2 are silicone rubbers with grafting-active sites as described in the DE-OS 2 704 657, 3 704 655, 3 631 540 and 3 631 539.

The gel content of the grafting base C.2 is determined at 25° C. in dimethylformamide (M. Hoffmann, H. Krömer, R. Kuhn, Polymeranalytik I and II, Georg Thieme-Verlag, Stuttgart 1977).

The moulding compounds according to the invention can contain other known additives for aromatic poly(ether sulphones), alpha-methylstyrene polymers and graft polymers, such as stabilizers, pigments, mould release agents, flame retardants and antistatic agents, in the usual amounts.

The moulding compounds according to the invention can be produced by mixing the constituents at high temperatures, preferably 200° to 350° C., in a known manner and melt-compounding or melt-extruding in usual apparatuses, such as internal kneaders, extruders or twin-shaft screws. The constituents can be mixed in succession or simultaneously.

Another subject-matter of the invention is thus a process for the production of the moulding compounds according to the invention by mixing their constituents at elevated temperature.

The moulding compounds according to the invention can be used for the production of mouldings of any kind, e.g. by injection moulding. Examples of mouldings are: casing parts (e.g. for household appliances such as juice presses, coffee machines and mixers), cover plates for the building industry or motor vehicle parts. They are also used for electrical appliances, e.g. for connector strips, since they have very good electrical properties.

Mouldings can also be produced by drawing from previously produced sheets or films.

Another subject matter of the invention is thus the use of the described moulding compounds for the production of mouldings.

EXAMPLES

The amounts given in the following examples are parts by weight.

Aromatic poly(ether sulphones) A 1141.7 parts 2,2-bis-(4-hydroxyphenyl)-propane and 1435.8 parts bis-(4-chlorophenyl)-sulphone are dissolved under nitrogen in 4500 parts N-methylpyrrolidone and 970 parts chlorobenzene, and 760 parts anhydrous potassium carbonate is added. The reaction mixture is heated over 30 minutes to 180° C. and held there for 5 hours, during which a mixture of water and chlorobenzene distills off. Over a further 4 hours the chlorobenzene distills off. After a reaction time of 6 hours the reaction mixture is cooled to 60°-70° C., and the polymer precipitated in methanol, washed with water and dried in vacuo. The polymer has a reduced viscosity of 0.52 dl/g ($CHCl_3$ at 25° C.).

Alpha-methylstyrene (AMS) polymer B

B1 (Comparative example)

An emulsifier solution of 2.5 parts by weight Na rosin soap (dresinate)in 150 parts by weight deionized water was charged to a 10 litre glass flask. It was heated to 75° C. and purged with nitrogen for 30 minutes. Then a solution of 0.35 parts by weight potassium persulphate in 20 parts by weight water was added. A monomer mixture of 69 parts by weight alpha-methylstyrene (AMS) and 31 parts by weight acrylonitrile (ACN) was added steadily over 6 hours. After the end of the addition there was a further 3 hours' stirring, after which the polymer latex was coagulated by addition of an aqueous mineral acid solution and dried (yield 98 %).

B2 (alpha-methylstyrene-acrylonitrile-acrylamide) terpolymer

An emulsifier solution of 2.5 parts by weight Na rosin soap (dresinate)in 150 parts by weight deionized water was charged to a 10 litre glass flask. It was heated to 75° C. and purged with nitrogen for 30 minutes. A monomer mixture of 35 parts by weight α-methylstyrene (AMS), 5 parts by weight acrylonitrile (ACN) and 1 part by weight acrylamide (AA) was added and emulsified for 10 minutes. Then a solution of 0.35 part by weight potassium persulphate in 20 parts by weight water was added and stirred for 1 hour at 75° C. A monomer mixture of 40 parts by weight AMS and 19 parts by weight ACN with 0.2 parts by weight tert.-dodecylmercaptan and a solution of 1 part by weight acrylamide in 20 parts by weight water were then dosed in over a period of 6 hours. When addition was complete, there was a further 2 hours of stirring and the polymer latex was then coagulated by addition of an aqueous mineral acid solution and dried. (Yield 97 %).

Graft polymers C

C1

Graft polymer of 50 parts by weight of a mixture of styrene and acrylonitrile in the ratio 72:28 on 50 parts by weight of particulate polybutadiene rubber with a mean particle diameter of 0.4 micron ($d_{50}$ value), produced by emulsion polymerization.

C2

Graft polymer of 50 parts by weight of a styrene-acrylonitrile mixture (weight ratio 72:28) on 50 parts by weight of a partially crosslinked polybutadiene with a mean particle diameter of 0.1 micron ($d_{50}$ value), and a gel content of 89 weight % in accordance with DE-OS 3 708 913.

Preparation

A mixture of 200 parts by weight of a 50 weight % polybutadiene latex and 149 parts by weight of water is charged to a reactor and heated to 60° to 62° C. At this temperature are added to the reactor in succession:

1. Mixture (emulsion) of
   0.0836 parts by weight cumol hydroperoxide
   6.9600 parts by weight water
   0.0600 parts by weight Na salt of $C_{14}$–$C_{16}$-alkyl sulphonic acids.
2. Mixture (solution) of
   0.0557 parts by weight ascorbic acid
   6.9600 parts by weight water Next the following mixtures Z1 to Z3 are added continuously to the reactor over 4 hours with stirring at an internal temperature of 60° to 62° C.

Z1: 39.05 parts by weight water
4.00 parts by weight Na salt of disproportionated abietic acid
3.10 parts by weight 1N sodium hydroxide solution
0.62 parts by weight cumol hydroperoxide
Z2: 72 parts by weight styrene
28 parts by weight acrylonitrile
Z3: 39.8 parts by weight water
0.105 parts by weight ascorbic acid The polymerization of the mixture is then completed in 6 hours at 60° to 62° C. The monomer conversion exceeds 97 weight %.

After stabilization with 1.2 parts by weight phenolic antioxidant per 100 parts by weight graft polymer, this polymer is precipitated by coagulation with an acetic acid/magnesium sulphate mixture, washed and dried to a powder.

The grafting yield, that is the weight ratio of the graft polymerized styrene and acrylonitrile to the total styrene and acrylonitrile, is 89 weight %.

The grafting yield was determined by fractional separation with the separating liquids dimethyl formamide/methylcyclohexane in the ultracentrifuge and by determining the amounts and the chemical composition of the fractions so obtained (see R. Kuhn, Makromol. Chemie 177, 1525 (1976)).

Production and testing of the moulding compounds according to the invention

A, B and C were melted together in a 1.3 litre internal kneader at 200° to 300° C. and homogenized.

From these moulding compounds rods of dimensions 80×10 ×4 mm were produced on an injection moulding machine (processing temperature: 260° C.), and the notched impact strength (by the ISO 180 method) was determined on the rods at room temperature, 0° C., −10° C., −20° C., −30° C. and −40° C.

From this the tough-brittle transition was determined, i.e. that temperature range in which the first brittle fractures occur.

The Vicat B softening temperature was measured in accordance with DIN 53 460.

As the following table shows, the moulding compounds according to the invention of Examples 2 and 3, compared with the moulding compound of Comparative Example 1 (where an ordinary commercial alpha-methylstyrene/acrylonitrile copolymer was used), have definitely improved notched impact strength and deflection temperature. The low-temperature impact strength is also favourably influenced by using the terpolymers according to the invention.

TABLE

| | Composition of the moulding compounds and their properties | | | | | | |
|---|---|---|---|---|---|---|---|
| | Constituents | | | | | Notched impact strength | Tough-brittle trans- | Vicat |
| Example | A | B1 | B2 | C1 | C2 | $a_k$ at 20° C. | ition | B 120 |
| | [weight %] | | | | | [kJ/m²] | [°C.] | [°C.] |
| 1 (comp.) | 60 | 20 | — | 20 | — | 38 | 0/−10 | 137 |
| 2 | 60 | — | 20 | 20 | — | 57 | −10/−20 | 143 |
| 3 | 60 | — | 20 | — | 20 | 68 | −20/−30 | 149 |

What is claimed is:

1. Thermoplastic molding compounds containing
   A. 5 to 99 parts by weight of an aromatic, high deflection temperature poly(ether sulfone),
   B. 5 to 95 parts by weight of a alpha-methyl styrene terpolymer obtained by polymerization of
   B.1 62 to 85 parts by weight of alpha-methyl styrene,
   B.2 10 to 50 parts by weight of acrylonitrile and/or methacrylonitrile, and
   B.3 1 to 50 parts by weight of acrylamide and/or methacrylamide, and
   C. 1 to 95 parts by weight of graph polymer of resin-forming monomers on a rubber.

2. Moulding compounds according to claim 1, containing 20 to 98 parts by weight of A and 10 to 75 parts by weight of B.

3. Moulding compounds according to claim 1, containing 2 to 60 parts by weight of C.

4. Moulding compounds according to claim 1, containing aromatic poly(ether sulphones) with a basic structure of repeating units of formula (I)

$$-O-Z-O-W- \qquad (I)$$

in which Z represents a divalent phenol group and W the group of a benzenoid dihalogeno compound with an inert electron-attracting group.

5. Moulding compounds according to claim 1, containing as C graft polymers from
   C.1 5 to 90 parts by weight of a mixture of
   C.1.1 50 to 95 parts by weight styrene, alpha-methylstyrene, halogen- or alkyl-ring substituted styrenes, $C_1$-$C_8$-alkyl methacrylates, $C_1$-$C_8$-alkyl acrylates or mixtures of these compounds and
   C.1.2 5 to 50 parts by weight acrylonitrile, methacrylonitrile, $C_1$-$C_8$-alkyl methacrylates, $C_1$-$C_8$ -alkyl acrylates, maleic anhydride, $C_1$-$C_4$-alkyl- or phenyl-N-substituted maleimides or mixtures of these compounds on
   C.2 10 to 95 parts by weight of rubber with a glass transition temperature below −10° C.

6. Moulding compounds according to claim 1, wherein the rubbers in graft polymer C are diene rubbers, acrylate rubbers, silicone rubbers or ethylenepropylene-diene rubbers.

7. Moulding compounds according to claim 1, containing stabilizers, pigments, flow aids, demoulding additives, flame retardants and/or antistatic agents.

* * * * *